(12) United States Patent
Diamond et al.

(10) Patent No.: US 11,488,122 B2
(45) Date of Patent: Nov. 1, 2022

(54) SYSTEM AND METHOD FOR ELECTRONICALLY TRANSFERRING MONEY

(71) Applicants: Antony J. H. Diamond, Boca Raton, FL (US); Eric Alan Wilson, Boynton Beach, FL (US)

(72) Inventors: Antony J. H. Diamond, Boca Raton, FL (US); Eric Alan Wilson, Boynton Beach, FL (US)

(*) Notice: Subject to any disclaimer, the term of this patent is extended or adjusted under 35 U.S.C. 154(b) by 775 days.

(21) Appl. No.: 15/181,395

(22) Filed: Jun. 13, 2016

(65) Prior Publication Data

US 2018/0046993 A1 Feb. 15, 2018

Related U.S. Application Data

(60) Provisional application No. 62/174,369, filed on Jun. 11, 2015.

(51) Int. Cl.
*G06Q 20/10* (2012.01)
*G06Q 20/40* (2012.01)

(52) U.S. Cl.
CPC ....... *G06Q 20/10* (2013.01); *G06Q 20/40145* (2013.01)

(58) Field of Classification Search
CPC ............ G06Q 20/40; G06Q 20/40145; G06Q 20/4012; G06Q 20/325; G06Q 20/10
USPC ........................................................... 705/44
See application file for complete search history.

(56) References Cited

U.S. PATENT DOCUMENTS

| 2002/0128967 | A1* | 9/2002 | Meyer | G06Q 20/04 |
| | | | | 705/40 |
| 2009/0094163 | A1* | 4/2009 | Shastry | G06Q 20/04 |
| | | | | 705/64 |
| 2010/0044433 | A1* | 2/2010 | Wankmueller | G07F 11/00 |
| | | | | 235/381 |
| 2010/0094752 | A1* | 4/2010 | Heath | G06Q 20/102 |
| | | | | 705/40 |
| 2014/0195424 | A1* | 7/2014 | Zheng | G06Q 20/351 |
| | | | | 705/41 |
| 2015/0363986 | A1* | 12/2015 | Hoyos | H05K 999/99 |
| | | | | 340/5.61 |

OTHER PUBLICATIONS

"Ziptip Selected to Exhibit at MIT Enterprise Forum's Tech Showcase", www.pr.com/press-release/403266, Apr. 4, 2012.

* cited by examiner

*Primary Examiner* — Scott C Anderson
(74) *Attorney, Agent, or Firm* — Stephen Bongini; Fleit Intellectual Property Law

(57) ABSTRACT

A system and method are provided for transferring money from a sender to a receiver. According to the method, non-private identifying information is received. The non-private identifying information is used to determine the identity of the receiver, and an indication is received of an amount of money to be transferred from the sender to the receiver. An account of the sender is debited and an account of the receiver is credited based on the amount of money to be transferred.

23 Claims, 4 Drawing Sheets

SYSTEM AND METHOD FOR ELECTRONICALLY TRANSFERRING MONEY

CROSS-REFERENCE TO RELATED APPLICATIONS

This application claims priority from U.S. Provisional Patent Application No. 62/174,369, filed Jun. 11, 2015, the entire disclosure of which is herein incorporated by reference.

FIELD OF THE INVENTION

The present invention generally relates to information processing systems, and more specifically relates to systems and methods for electronically transferring a small amount of money from an individual to another individual or entity.

BACKGROUND OF THE INVENTION

Currently, cash is used to transfer a small amount of money from one person to another. Cash is used for such transactions because electronically transferring a small amount of money is burdensome and inconvenient. Current electronic transfer methods require the receiver to provide private identifying information such as an email address or phone number. This is time consuming with regard to the transfer of a small amount of money, and does not protect the security and maintain the privacy of the sender and the receiver. A phone number and an email address each constitute private identifying information that an individual does not want to divulge to an unknown individual for security and privacy reasons. Current methods also typically require the sender to go through many time-consuming steps to send the small amount of money.

Further, a credit card is not used because most individuals cannot personally process credit card payments. Even if an individual can personally process a credit card payment, the credit card payment process is time consuming and inconvenient for a small payment. The credit card payment process also requires the sending individual's credit card information to be provided to the receiving individual. This creates a security concern and also requires that the receiving individual protect the credit card information. Credit card companies may also have minimum payment amounts and can charge high fees for small payments.

As an example, Person A is attending a large gathering such as a wedding or an employer's holiday party. At the gathering there is an open bar where the guests wait in line and receive free beverages. While the beverages are free, it is customary and expected that Person A will give a tip (i.e., a small amount of money) to the bartender, Person B. The only way for Person A to tip Person B is through a tip jar that is on the bar for receiving tips in the form of cash. Person A wants to give Person B a tip but does not have the cash to do so. For example, Person A may be carrying credit cards and no cash, or may only have cash in large denominations when a small tip is desired. Thus, Person A is left with a choice between not tipping Person B and either borrowing cash from another person or going elsewhere to get cash or change before getting a beverage. These days such a scenario is common because many people do not carry any cash or only carry large denominations.

SUMMARY OF THE INVENTION

It is an object of the present invention to provide systems and methods for allowing one person to electronically transfer (give) a small amount of money to another person or entity.

One embodiment of the present invention provides system a method for transferring money from a sender to a receiver. According to the method, non-private identifying information is received. The non-private identifying information is used to determine the identity of the receiver, and an indication is received of an amount of money to be transferred from the sender to the receiver. An account of the sender is debited and an account of the receiver is credited based on the amount of money to be transferred.

Another embodiment of the present invention provides a system for transferring money from a sender to a receiver. The system includes at least one processor programmed to receive non-private identifying information, determine identity of the receiver based on the non-private identifying information, receive an indication of an amount of money to be transferred from the sender to the receiver, and debit an account of the sender and credit an account of the receiver based on the amount of money to be transferred.

Yet another embodiment of the present invention provides a tangible computer readable medium encoded with a program for transferring money from a sender to a receiver. The program including instructions for receiving non-private identifying information, using the non-private identifying information to determine the identity of the receiver, receiving an indication of an amount of money to be transferred from the sender to the receiver, and debiting an account of the sender and crediting an account of the receiver based on the amount of money to be transferred.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Embodiments of the present invention provide a system for allowing one person to electronically transfer (give) a small amount of money to another person or entity. Embodiments of the present invention eliminate the need for cash when transferring a small amount of money, such as when giving a gratuity or other small payment or gift. The present invention is particularly suited for use with portable electronic devices such as cell phones and smartphones.

In preferred embodiments of the present invention, the receiver does not need to know the identity of the sender. Further, the receiver is not required to provide banking information or private identifying information such as an email address or phone number to the sender. In one embodiment, the sender does not even need to know the identity of the receiver. Thus, the present invention can provide a quick and easy to use system for electronically transferring a small amount of money from one individual to another in an anonymous manner that provides security and privacy to both individuals.

Figure 1:
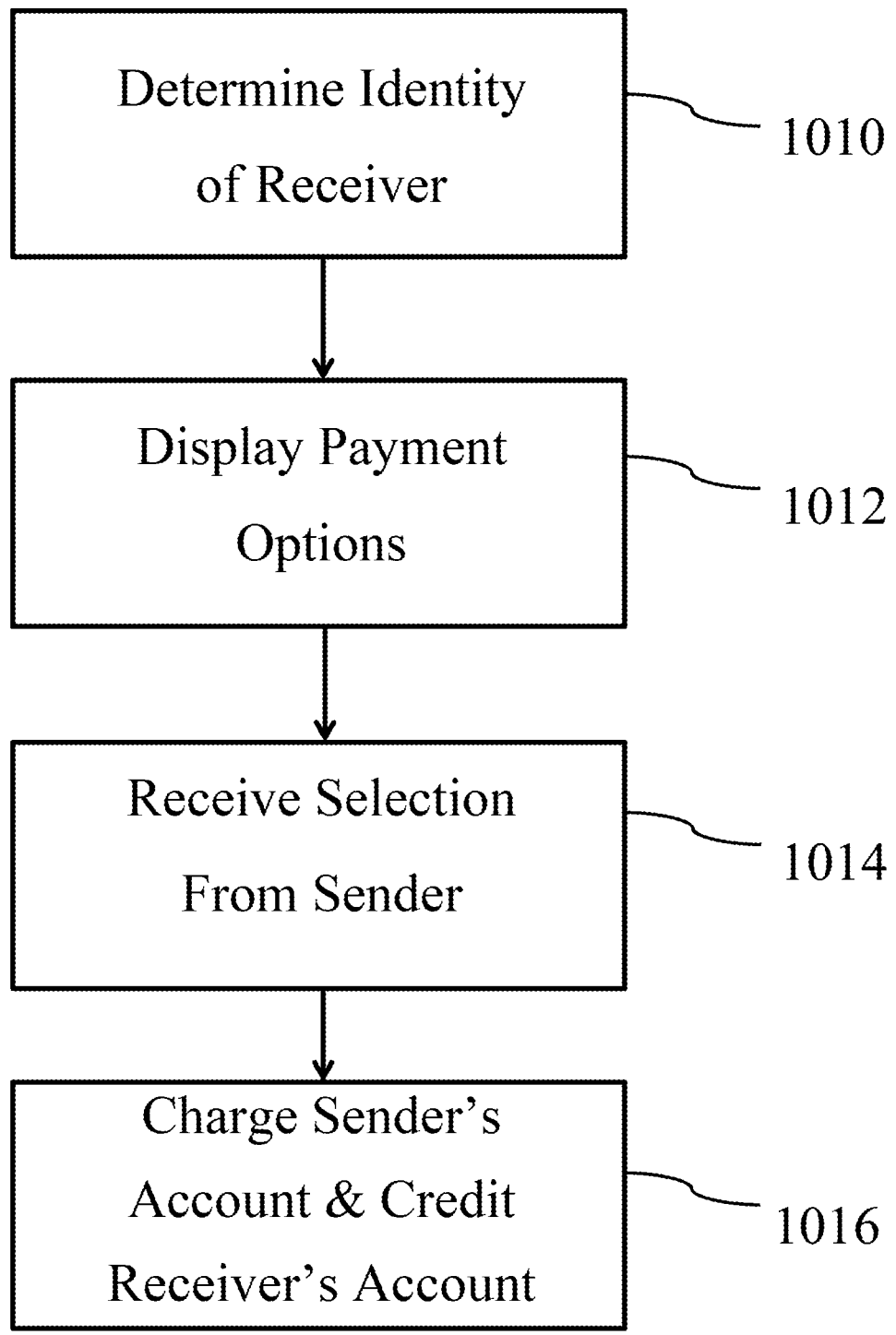
FIG. 1 is a flowchart of a process for electronically transferring a small amount of money between individuals according to one embodiment of the present invention.

FIG. 1 shows a process for electronically transferring a small amount of money between individuals according to one embodiment of the present invention. In this exemplary embodiment, both the sender (Person A) and the receiver (Person B) must register and the sender must install an application prior to the illustrated steps of the money transfer process. Person B provides a service to Person A, and in return Person A decides to give a small amount of money to Person B as a gratuity. For example, Person B could be a hair dresser, manicurist, valet, waiter, bartender, entertainer, delivery person, hotel staffer, skycap, tour guide, someone else who provides a service, or anyone to which Person A simply wants to give or donate money. While many of the described examples relate to giving a gratuity, the present invention is not limited to the service industry. The system of the present invention can be used by any person to pass a small amount of money to another person (or entity). Person A can give Person B a small amount of money, such as a gratuity to a service provider or a parent giving their child $20 spending money.

In this exemplary method, Person A uses the installed application to send some type of non-private identifying information such as a unique token or code (e.g., barcode or QR code) to the system to allow the system to determine the identity of the receiver, at step 1010. This is accomplished in a manner that does not require the receiver to provide banking information or private identifying information such as an email address or phone number. In this embodiment, the receiver is identified through a piece of unique non-private identifying information by inputting a code (e.g., manually inputting a code or scanning a barcode or QR code) or capturing an image or other biometric information. The application uses the non-private identifying information to look up the receiver in the system's database of registered users. The application displays a picture and the first name of the person from the database that is determined to be receiver so that the sender can confirm that it is the correct person. In another embodiment, the application uses the device's camera and facial recognition to identify the receiver as explained below.

Next, the application displays payment options to the sender to determine the amount to transfer, at step 1012. In this embodiment, the displays lists various small dollar amount options (e.g., from $1 to $20), an "other" option, and a percentage option. The "other" option allows the sender to manually enter any amount up to the transfer limit, and the percentage option allows the sender to input a sale amount and a percentage in order to send an amount that is a percentage of the price paid (e.g., 18% of a restaurant or bar bill).

At step 1014, the sender selects one of the payment options, such as by clicking on or tapping the desired amount. Then, the system electronically transfers the money by charging the sender the selected amount and crediting the receiver, at step 1016. The receiver receives an instant notification through the application that money has been received from the sender via one or more of a ping, in-app message, instant message, text message, and the like. In this exemplary embodiment, the charge and credit are respectively made to the sender's and receiver's PayPal accounts, which were provided to the system at registration. In other embodiments, the sender can use other forms of payment such as a credit card charge or direct bank account debit, and the receiver can receive the money in another way such as a direct bank account credit (e.g., through an ACH transfer).

In the illustrated embodiment, the system accumulates all of the charges made by a sender (and similarly accumulates all of credits received by a receiver) over a set time period such as one day, and makes one PayPal transfer for the total amount for each person. For example, if a bartender receives 50 small tips over the course of an evening, in this embodiment a single PayPal transfer for the total amount of all 50 tips is made to the bartender's account (instead of 50 small transfers). Similarly, a sender that makes 4 tips over the course of a day will receive one PayPal charge for the total amount of the 4 tips (instead of 4 small charges). If the user is both a sender and receiver, the net amount of all transfers sent and received by the user during that day is credited or debited to the user's account (instead of multiple credits and debits). However, in other embodiments each transfer is made instantaneously (or near instantaneously). That is, when the sender transfers or gives money to the receiver, that amount is instantly transferred into the receiver's PayPal account.

The system monetizes the money transfer by charging a nominal fee (for example, in some embodiments a flat fee such as 25 cents or any other amount and/or a percentage such as 1% or any other percentage) to the sender and/or receiver for each money transfer that is sent through the system. In the illustrated embodiment, the amount that the receiver receives is the amount of the transfer minus a nominal fee of 1%. The system provider acts as intermediary by transferring the full amount of the transfer from the sender's PayPal account to the system provider's account, and then transferring the full amount minus the nominal fee from the system provider's account to the receiver's account. Thus, the nominal fee is automatically kept in the system provider's account, and anonymity is maintained between the sender and receiver.

In another embodiment, the sender pays the nominal fee by having the system automatically add the nominal fee to the transfer amount and then withdrawing that sum from the sender's PayPal account. In other embodiments, the exact transfer amount is withdrawn from the sender's account and credited to the receiver's account. An additional transfer for the amount of the nominal fee is separately and automatically withdrawn from the sender's (or receiver's) account and credited to the system provider's account. In one such embodiment, the nominal fees for all transfers made during a specified period (e.g., day, week, or month) are summed and withdrawn in one transfer from the sender's (or receiver's) account. Alternatively, the payment system used (e.g., PayPal or credit card company) could be set up to automatically withdraw one amount from the sender's account, credit another amount to the receiver's account, and credit the nominal fee to the system provider's account.

Embodiment of the present invention will now be described in detail with reference to the screenshots of FIGS. 2-5. In a first exemplary embodiment, an individual gives a gratuity to a bartender. First, the individual (sender) and the bartender (receiver) separately register with the system. This can be accomplished by going to a website and registering as a user from any computer or electronic device. This can also be accomplished by downloading the system's application (e.g., from Apple's App Store or the Google Play Store), installing it on a portable electronic device (e.g., a smartphone, tablet, PDA, or smartwatch or other wearable device), and registering within the application as a user. In this embodiment, the sender inputs or otherwise provides credit card information, bank account information, and/or PayPal account information in order to be able to send money. The receiver inputs or otherwise provides bank account information and/or PayPal account information in order to be able to receive money. A user can register to both send and receive money through the system.

The application includes a GIVE (send) function and a RECEIVE function. The RECEIVE function can be used by the bartender to register to receive money in the manner explained above. In this exemplary embodiment, a unique barcode (or QR code) is assigned to the bartender at registration. This is a one-time allocation of an individual barcode that is unique to the bartender. Whenever desired, the bartender can use the RECEIVE function to change the barcode that is assigned.

The GIVE function can be used by the sender to register to give/tip/send money in the manner explained above. After registration, the sender can send money to any other user of the system who has registered as a receiver.

Figure 2:
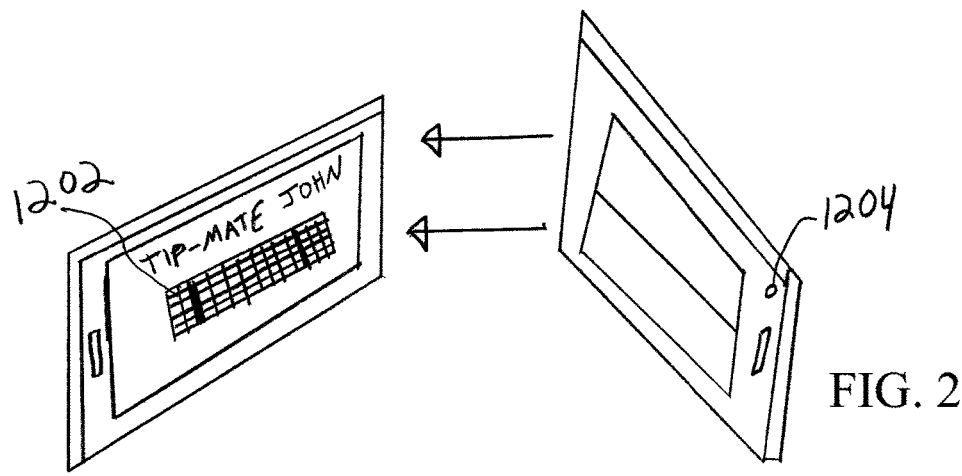
FIGS. 2-5 are screenshots of processes for electronically transferring a small amount of money between individuals in accordance with various embodiments of the present invention.

In this example, both the sender and bartender are using smartphones and have previously registered using their PayPal accounts. To receive a gratuity, the bartender opens the system application and selects RECEIVE to display the unique barcode 1202 of the bartender on the bartender's smartphone. The sender opens the system application and selects the GIVE function. This opens a barcode scanner within the application. The sender's smartphone camera 1204 is pointed at the barcode displayed on the bartender's smartphone, as shown in FIG. 2. The application then scans the barcode of the bartender. The application on the sender's smartphone sends the scanned information to the system over a Wi-Fi or cellular connection. The system uses this information to search its user database and determine the identity of the bartender.

Figure 4:
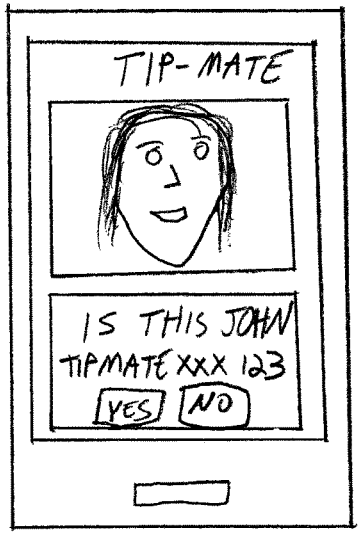
Figure 5:
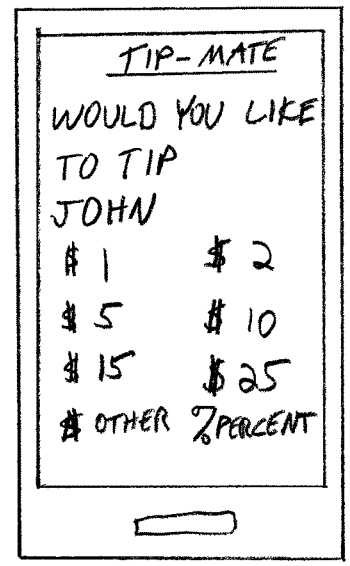

After the bartender is identified by the system, the system responds by sending non-private identifying information about the bartender to the sender's smartphone in order to allow the sender to confirm that the right person was identified by the system. As shown in FIG. 4, the bartender's picture, first name, and a reference identifier (such as the text of the bartender's unique barcode) are sent and displayed on the sender's smartphone in this example. The sender confirms the identity of the bartender, and then the two are "connected". The sender's smartphone then displays options to set the amount that is to be sent to the bartender. As shown in FIG. 5, the amount options displayed in this example are $1, $2, $5, $15, $25, OTHER, and PERCENT. Preferably, the maximum amount that can be sent to any one person, at once or over the course of a set time period (such as a day), is limited (for example, to $100). By not allowing unlimited amounts of money to be transferred, the system decreases the chance of nefarious and fraudulent use.

In response to the sender choosing and confirming the amount to be sent, the system credits the bartender's account for the chosen amount of money. The next day, the system makes a single charge to the sender's PayPal account for all of the transfers sent by the sender on this day, and makes a single credit to the bartender's PayPal account for all of the transfers received by the bartender on this day. In an alternative embodiment, this single money transfer is immediately credited and debited from their respective PayPal accounts (and/or bank or credit/debit card accounts). In other embodiments, the system internally maintains an account for each registered user and money is debited and credited to this account for each transfer. In one such embodiment, the user can add money to the system account at any time by giving cash to a registered agent or by transferring money from a bank account or credit/debit card. The user can withdraw money from the system account at any time by receiving cash from a registered agent or by receiving a credit to a bank account or credit/debit card account. In general, the money is sent to an account from which it can be withdrawn, transferred to another account of the user (e.g., bank account), or otherwise spent. In this example, the system monetizes the money transfer by deducting a 1% fee from the receiver for handling the money transfer.

For the users, the transaction is very quick and easy. Person A is at a bar or an open bar function and wants to give money to (tip) Person B, the bartender. Person A does not need any cash or even a credit card, and does not have to provide any private identifying information to Person B. Person A simply asks Person B if they are a member of the system. Person B responds affirmatively and they pull out their smartphones (or other portable electronic devices). Person B opens the system's application and selects "RECEIVE" to display the unique barcode for receiving payment. Person A also opens the system's application and selects "GIVE" to open the scanner. Person A then scans the bartender's barcode to connect their two accounts for this single transaction.

Person A then simply confirms that the system has chosen the correct person from its database based on on-private identifying information and chooses how much to give (tip) the bartender (e.g., from a list of monetary amounts). After a confirmation, the chosen amount is immediately credited to the bartender's account on the system. Thus, the system allows two people to come together, and one person can send/give the other person money that is paid to an individual account using information such as a unique barcode that has been allocated to the other person at registration as a receiver. The receiver does not have to provide banking information or any private identifying information to the sender. The system also provides the money directly to the service provider. This prevents any forced splitting of the receiver's tips, and removes their employer's overhead in time and transaction costs in processing credit card tips. Thus, the system of the present invention provides a quick and easy to use system for electronically transferring/giving a small amount of money from one individual to another, while providing security and privacy to both individuals.

A second embodiment of the present invention will now be described. In this embodiment, an individual gives a gratuity to a valet and facial recognition is used to automatically identify the valet. As in the previous embodiment, the individual (sender) and the valet (receiver) separately register with the system (e.g., through a website or within the application itself). In this embodiment, both the sender and valet are using smartphones and have previously registered using their bank accounts.

Figure 3:

In the second embodiment, after confirming that the valet is a registered user of the system, the sender opens the system application and selects the GIVE function. This turns on facial recognition within the application using the camera of the sender's portable electronic device. The sender captures an image of the valet using the device's camera under control of the application, as shown in FIG. 3. The image is sent to the system, which performs facial recognition on the captured image from the camera to determine the identity of the valet. In this embodiment, the captured image of the receiver comprises unique non-private identifying information of the receiver.

In this embodiment, during registration each user that is registering as a receiver supplies a photograph to the system. The system maintains a database of the faces of all registered receivers, and uses facial recognition technology to match the image of a receiver with the system's database. In alternative embodiments, the system uses a third party provider's database to provide the facial recognition, such as Google or Facebook. Further, a future smartphone (or other portable electronic device) could include the built-in ability to automatically identify an individual simply by using the device's camera to capture the person's face.

After the valet is identified by the system, the system responds by sending non-private identifying information about the valet to the sender's smartphone in order to allow the sender to confirm that the right person was identified by the system. The sender confirms the identity of the valet, and then the sender's smartphone displays options to set the amount that is to be sent to the valet. In response to the sender choosing and confirming the amount to be sent, the system notifies the valet that the amount was received (e.g., through an in-app message or text message). The next day, the system makes a single charge to the sender's bank account for all of the transfers sent by the sender on this day, and makes a single credit to the valet's bank account for all of the transfers received by the valet on this day. In an alternative embodiment, this single money transfer is immediately credited and debited from their respective bank accounts In this example, the system monetizes the money transfer by adding a 1% fee to the sender's transfer amount for handling the money transfer.

Thus, such embodiments allow the two people to connect simply from the sender's camera being pointed at the receiver's face. The sender's camera captures an image of the person and the identity of that person is automatically determined. In other embodiments, other biometric information such as a fingerprint, iris scan, or the like is used as the unique non-private identifying information.

Further embodiments of the present invention use other information as the non-private identifying information that is used to identify the receiver. For example, in some embodiments, registered users can recognize the receiver using geo-location and/or geo-tagging based on their proximity to one another. In one such embodiment, if the sender is at a bar or restaurant, the sender's smartphone would recognize this through its GPS or other geo-location functionality and send this information to the system. The system matches this location with the location of other registered users and automatically provides the sender with a list of those other registered users at the bar. The sender then can simply select the correct receiver from this list (for example, by name and/or picture). In such embodiments, the geo-location information of the sender and/or receiver comprises unique non-private identifying information of the receiver.

In another embodiment, a user can register as an employee of an establishment. When the sender opens the application to send money, the system matches the location of the sender with the registered employees that are currently also located at the same establishment. The system only shows these registered employees in the list of possible/suggested recipients. This makes it very easy to select the bartender or waiter that is serving the sender. Similarly, iBeacon technology can be used to automatically recognize other registered users at the same location and thus make the money transfer process easier. Alternately, the user could check into the establishment on this or another application, and then this location information can be used by the system to recognize other registered users at the same location or registered as working at the same location.

A third embodiment of the present invention will now be described. In this embodiment, an individual gives a gratuity to a waiter and the waiter is recognized under the umbrella of an establishment. In this embodiment, the individual (sender) and the establishment (restaurant) separately register with the system (e.g., through a website or within the application itself). The waiter (receiver) is register with the system as an employee of the restaurant (by the restaurant or the waiter). In this embodiment, the sender is using a smartphone and has previously registered using a credit card account.

When the sender opens the system's application, the application uses the device's GPS or other geo-location functionality to determine the location of the sender and sends this information to the system. The system matches this location with the location of the registered restaurant and automatically provides the sender with a list of the registered employees of the restaurant. The sender simply selects the correct waiter from the list (e.g., through a picture and/or first name). In this embodiment, the geo-location information of the sender comprises unique non-private identifying information of the receiver. This information is combined with the registered employees of the restaurant in determining the identity of the receiver.

After the waiter is identified by the system, the system responds by displaying options to set the amount that is to be sent to the waiter. In response to the sender choosing and confirming the amount to be sent, the system notifies the waiter that the amount was received (e.g., through an in-app message or text message). The next day, the system makes a single charge to the sender's credit card for all of the transfers sent by the sender on this day, and makes a single credit to the restaurant's bank account for all of the transfers received by the employees of that restaurant on this day. The restaurant distributes the appropriate amount to its employees based on its tipping system. In this example, the system monetizes the money transfer by subtracting a 1% fee from the restaurant's transfer amount for handling the money transfer. In an alternative embodiment, the system makes a single credit to the waiter's account (e.g., bank or PayPal account) for all of the transfers received by the waiter on this day. This reduces the restaurant's overhead and allows the waiter to keep the entire tip.

Such embodiments allow the restaurant to promote itself and/or the application. For example, the application can be featured on the restaurant's Wi-Fi network. Further, a new user signing up within that restaurant or a registered user located in that restaurant can be provided with special offers (such as discounts or free add-ons). Also, the application can alert the establishment to the presence of the user. Then the establishment can and use the application to determine the level of loyalty in a loyalty club (for example, based on number and/or length of visits over a specified period, amount given and/or frequency of giving, etc.). Thus, the establishment itself can participate in the system.

In some embodiments, the user can also give money to the establishment (e.g., in response to a special offer). In one such embodiment, when a user walks into a restaurant, the application on the user's device automatically recognizes the establishment (e.g., through the Wi-Fi network, geo-location, iBeacon, etc.). The application alerts the user and displays a special offer notification such as "12 CHICKEN WINGS FOR $5—PAY NOW". If the user wants to order the special, the user clicks or taps a corresponding button to order and pay for the item. The charge is withdrawn from the user's account and the establishment (restaurant) is credited for that amount minus the nominal fee. Similarly, the system could be used to pay for drinks at a bar (and optionally also to order), instead of having to use cash. Drink offers are displayed on the user's device, the user selects one or more of the offered drinks, and then the user pays for the drinks and/or gives a gratuity via the system (as described above).

Figure 6:
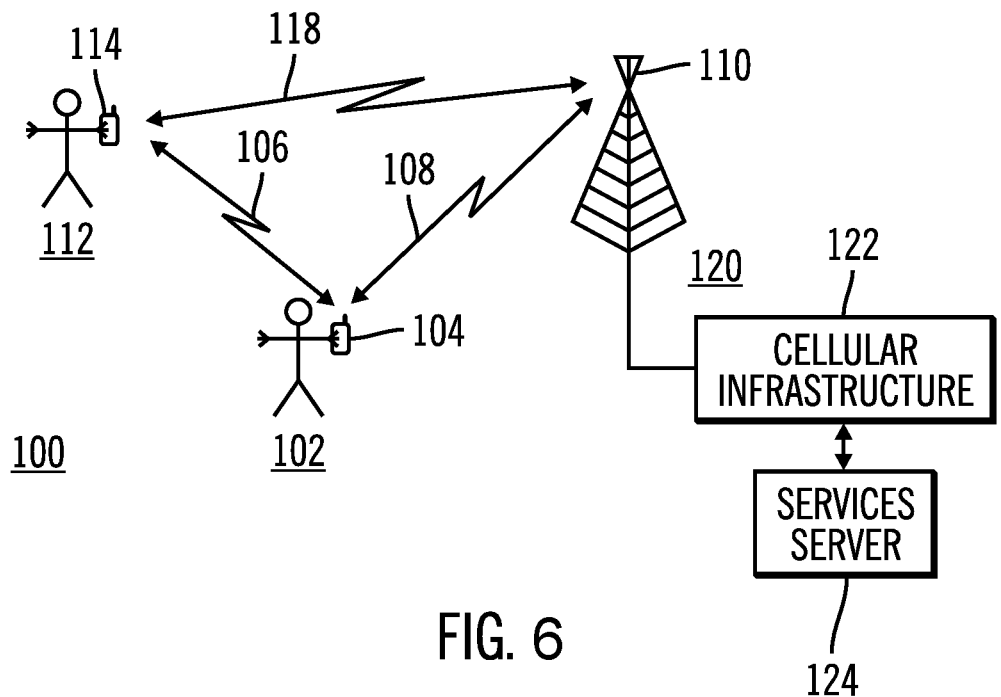
FIG. 6 illustrates an exemplary wireless communications environment for embodiments of the present invention.

FIG. 6 illustrates an exemplary wireless communications environment for embodiments of the present invention. The exemplary wireless communications environment 100 shows two users, a first user 102 and a second user 112. Two users are illustrated in this example is for clarity of description, and embodiments of the present invention are able to operate with any number of users. Each of these two users has a wireless communications device (e.g., smartphone): a first wireless communications device 104 and a second wireless communications device 114, respectively. The exemplary wireless communications environment 100 further includes a cellular base station 120 that includes a base station antenna 110. The cellular base station 120 is connected to a cellular infrastructure 122 that, in the exemplary embodiment, operates similarly to conventional cellular infrastructures. This description includes only one cellular base station 120 for clarity of description. Systems incorporating embodiments of the present invention are able to utilize one or more cellular infrastructure systems 122 that each include multiple cellular base stations 120 that operate to form a wireless communications system over a geographic area.

The cellular infrastructure 122 of the exemplary embodiment includes a connection to a services server 124. Services server 124 in the exemplary embodiment is a data processing system that implements user services for subscribers to the cellular infrastructure. Additionally, data and data messages, such as text messages transmitted according to the Short Message Service (SMS) protocol, are able to be exchanged between two or more wireless communications devices. The wireless communications devices, such as the first wireless communications device 104 and the second wireless communications device 114, are able to communicate in a communications mode that includes communication with a cellular base station 120, such as over a first base station wireless link 108 and a second wireless base station wireless link 118. Communications between two wireless communications devices can be accomplished through communications through cellular base station 120. Communications through the cellular base station 120, and on through the cellular infrastructure, further allow communications between a wireless communications device and, for example, wired phone lines and Internet-based devices (e.g., computers and servers connected to the Internet).

The wireless communications devices, such as the first wireless communications device 104 and the second wireless communications device 114, are able to communicate with each other through a variety of communications protocols. For example, the wireless communications devices are able to communicate by using lower power consumption wireless communications modes, such as a Bluetooth® communications links. Other suitable embodiments include IEEE 802.11 wireless data communications protocols, such as IEEE 802.11ac, 802.11b, 802.11g, and 802.11n protocols defined by the Institute of Electrical and Electronic Engineers (IEEE) of New York, N.Y.

Figure 7:
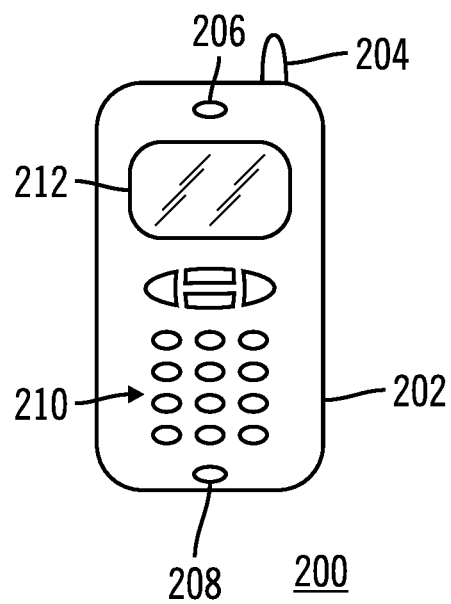
FIG. 7 illustrates a portable electronic device for use with an exemplary embodiment of the present invention.

FIG. 7 illustrates a portable electronic device for use with an exemplary embodiment of the present invention. The exemplary portable electronic device 200 corresponds to the wireless communications device described above. The exemplary portable electronic device 200 includes a case 202 with several components. The exemplary portable electronic device 200 has a display 212 that is able to display numeric and/or graphical information to the user. The exemplary portable electronic device 200 further includes a keypad 210 that includes alphanumeric keys and control keys as are commonly provided on portable electronic devices. The display 212 and keypad 210 are able to accept contact names and telephone numbers, as well as other information, via user input. Alternatively, the device can omit the physical keypad and have only an electronic keyboard that is shown on the display.

The exemplary portable electronic device 200 also has a speaker 206 and a microphone 208 to support voice communications over a wireless link. The exemplary portable electronic device 200 further has a radio frequency signal antenna 204 used to transmit and receive wireless communications signals.

Figure 8:
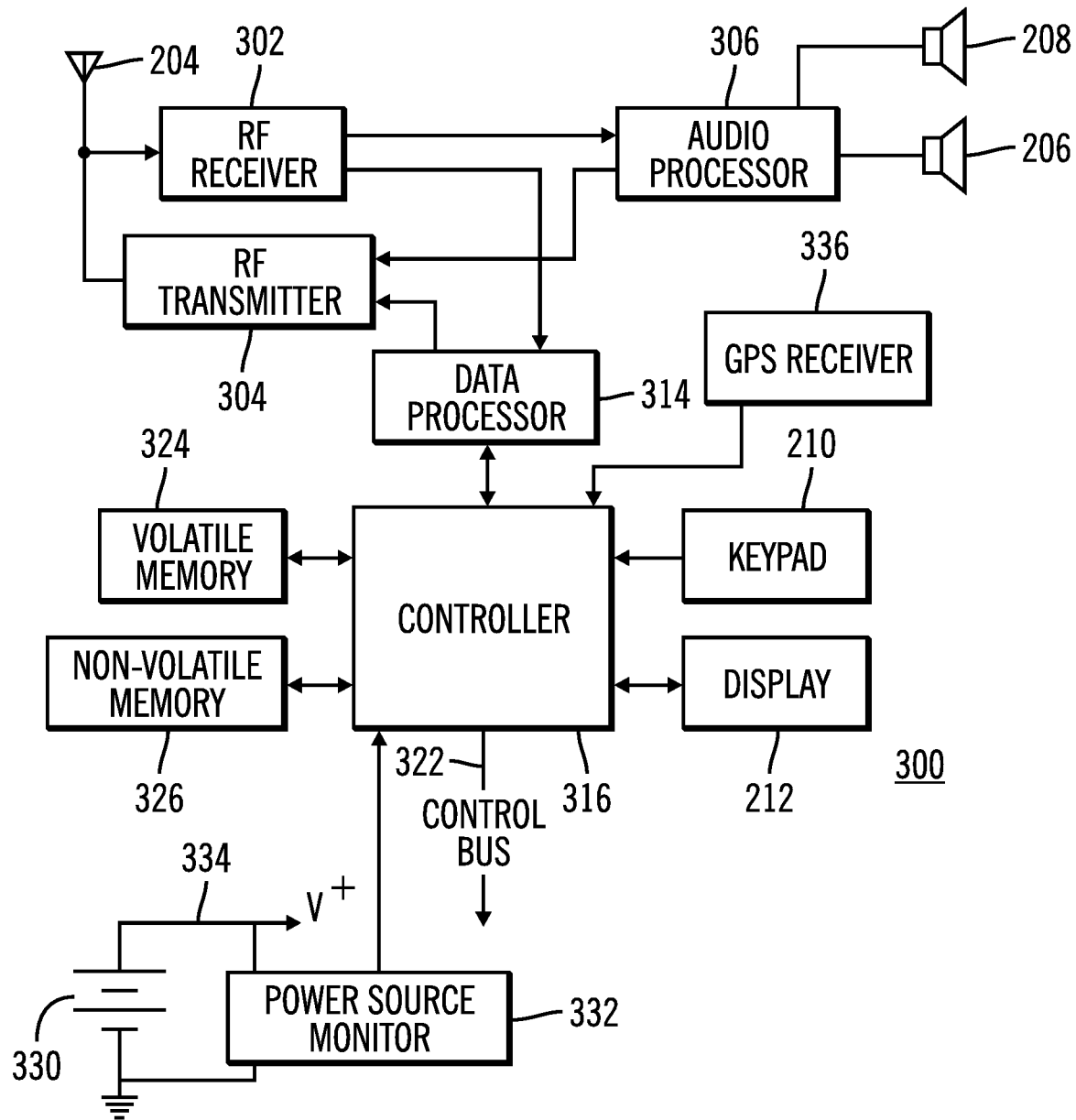
FIG. 8 is a circuit block diagram of the portable electronic device illustrated in FIG. 7.

FIG. 8 is a circuit block diagram of the portable electronic device illustrated in FIG. 7. The exemplary portable electronic device includes the antenna 204 connected to an RF receiver 302 and an RF transmitter 304. The portable electronic device 200 is able to simultaneously transmit and receive voice and/or data signals. The RF Transmitter 304 and RF receiver 302 of the exemplary embodiment include dedicated and/or reprogrammable and/or reconfigurable circuits, including programmable processors, to support transmission over multiple wireless communications modes, such as various cellular telephone protocols (e.g., GSM, UMTS, LTE, or 5G), and/or wireless data communications protocols (e.g., Wi-Fi or Bluetooth®).

The RF receiver 302 and the RF transmitter 304 each connect to an audio processor 306 to provide and accept audio signals to support simplex and/or duplex voice communications over a wireless link. The audio processor 306 further accepts audio signals from the microphone 208 and provides suitably amplified audio signals to speaker 206 to support an audio interface with the user of the exemplary portable electronic device 200. The exemplary portable electronic device 200 further includes a battery 330, which is a power source. The exemplary portable electronic device 200 also includes a power source monitor 332.

The controller 316 controls the operation of the portable electronic device in the exemplary embodiment. Controller 316 is connected to the various components of the portable electronic device via control bus 322. Controller 316 communicates data to external devices, such as a base station and/or a server, through a wireless link (e.g., GSM, LTE, or Wi-Fi). Controller 316 provides data to and accepts data from data processor 314. Data processor 314 of the exemplary embodiment performs communications processing necessary to implement over-the-air data communications to and from external devices. For example, data processor 314 formats data messages and performs the processing to prepare and transmit or to receive SMS data messages, data via the LTE protocol, or data packets via the Bluetooth® protocol. This combination of components forms a notification transmitter in the exemplary embodiment. Data processor 314 also provides data for transmission to the RF transmitter 304 and accepts received data from RF receiver 302. Controller 316 provides visual display data to the user through display 212. Controller 316 also accepts user input from keyboard/keypad 210 (which can be physical and/or electronic).

The exemplary portable electronic device 200 further includes non-volatile memory 326. Non-volatile memory 326 stores program data and more persistent data for use by the controller 316. Data stored in non-volatile memory 326 of the exemplary embodiment can be changed under control of controller 316 if called for by particular processing performed by the controller 316. The exemplary portable electronic device 200 further contains volatile memory 324. Volatile memory 324 is able to store transient data for use by processing and/or calculations performed by the controller 316.

The exemplary portable electronic device 200 includes a location detector that includes a GPS receiver 336 in the exemplary embodiment. The location detector determines the geographic location of the exemplary portable electronic device 200 and provides that geographic location to controller 316. Alternatively, the portable electronic device 200 is able to derive location information using known techniques including, but not limited to: 1) location determination based upon triangulation processing of radio signal propagation delays to multiple cellular towers from the exemplary cellular phone, and 2) using the known geographic location of short range wireless access points utilized by, for example, IEEE 802.11 and/or Bluetooth® communications links.

In the embodiments of the present invention described above that involve the use of a non-private unique identifying code (e.g., a token, barcode, or QR code) to identify the receiver, the barcode is displayed on the receiver's device. However, the present invention is not so limited. In other embodiments, the receiver can print their non-private code (e.g., barcode) and display it at the site (e.g., on the bar). In such an embodiment, no or minimal interaction is required from the receiver. The sender opens the system's application and selects "GIVE" to open the scanner. The sender then scans the receiver's printed barcode to identify the receiver, confirms that the system has chosen the correct person from its database, and chooses how much to give (tip) the receiver from a list of monetary amounts. After a confirmation, the chosen amount is credited to the receiver's account.

Likewise, while many of the examples above relate to giving a gratuity, the present invention is not so limited. The system of the present invention can be used to allow one person to electronically transfer (give) money to another person in many and varied situations. Similarly, the features of the different embodiments described above can be combined for further applications. Other design choices, such as network protocols, identifying methods and criteria, and registration requirements, could also easily be adapted. For example, NFC or RFID technology could be used to identify the receiver.

The present invention can be realized in hardware, software, or a combination of hardware and software. Any kind of portable electronic device is suited. A typical combination of hardware and software could be a general purpose smartphone with a computer program that, when loaded and executed, controls the smartphone such that it carries out the methods described herein.

The present invention can also be embedded in a computer program product, which comprises all the features enabling the implementation of the methods described herein, and which—when loaded in an electronic device—is able to carry out these methods. In the present context, a "computer program" includes any expression, in any language, code or notation, of a set of instructions intended to cause a system having an information processing capability to perform a particular function either directly or after either or both of the following: a) conversion to another language, code, or notation; and b) reproduction in a different material form.

Each electronic device may include one or more computers and a computer readable medium that allows the device to read data, instructions, messages, or message packets, and other computer readable information from the computer readable medium. The computer readable medium may include non-volatile memory such as ROM, Flash memory, a hard or floppy disk, a CD-ROM, or other permanent storage. Additionally, a computer readable medium may include volatile storage such as RAM, buffers, cache memory, and network circuits.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed.

What is claimed is:

1. A computer-implemented method for electronically transferring money in person from a sending individual to a receiving individual while providing privacy to the receiving individual, said method comprising the steps of:

receiving, from a portable electronic device of the sending individual, a unique non-private identifying code, barcode, or QR code of the receiving individual, wherein the code, barcode, or QR code is first non-private identifying information of the receiving individual, wherein the receiving individual does not provide banking information or private identifying information to the sending individual so as to maintain the privacy of the receiving individual, and wherein the sending individual and the receiving individual are at the same location;

using the first non-private identifying information of the receiving individual to determine identity of the receiving individual;

sending, to the portable electronic device of the sending individual, second non-private identifying information of a person that is determined to be the receiving individual so as to allow the sending individual to confirm that the identity of the receiving individual, the second non-private identifying information being different than the first non-private identifying information;

receiving, from the portable electronic device of the sending individual, a confirmation that the identity of the receiving individual was correctly determined;

receiving, from the portable electronic device of the sending individual, an indication of an amount of money to be transferred from the sending individual to the receiving individual; and debiting an account of the sending individual and crediting an account of the receiving individual based on the amount of money to be transferred, wherein the sending step and/or at least one of the receiving steps comprises communicating data wirelessly to and/or from the portable electronic device of the sending individual via at least one of an IEEE 802.11 wireless communication protocol, a wireless communication protocol in which two or more piconets form a scatternet, a cellular protocol that provides for orthogonal frequency-division multiple access, or a version of the 5G cellular protocol.

2. The computer-implemented method of claim 1, wherein the account of the sending individual is one of a bank account, a credit card account, and an online payment system account, and the account of the receiving individual is one of a bank account and an online payment system account.

3. The computer-implemented method of claim 1, wherein the step of receiving the unique non-private identifying code, barcode, or QR code comprises:

receiving, from a portable electronic device of the sending individual, an image of the code, barcode, or QR code that was captured by the portable electronic device of the sending individual.

4. The computer-implemented method of claim 1, further comprising the steps of:

receiving additional indications of amounts of money to be transferred from the sending individual; and receiving additional indications of amounts of money to be transferred to the receiving individual, wherein the debiting and crediting step comprises:

summing all of the amounts of money to be transferred from the sending individual over a specified period and making a single debit to the account of the sending individual based on the sum; and summing all of the amounts of money to be transferred to the receiving individual over the specified period and making a single credit to the account of the receiving individual based on the sum.

5. The computer-implemented method of claim 1, wherein the debiting and crediting step comprises immediately debiting the account of the sending individual and immediately crediting the account of the receiving individual based on the amount of money to be transferred.

6. The computer-implemented method of claim 1, wherein in the debiting and crediting step, one of:

the account of the sending individual is debited by the amount of money to be transferred, and the account of the receiving individual is credited by the amount of money to be transferred minus a fee, and the account of the sending individual is debited by the amount of money to be transferred plus a fee, and the account of the receiving individual is credited by the amount of money to be transferred.

7. The computer-implemented method of claim 1, wherein the step of sending the second non-private identifying information comprises:

sending, to the portable electronic device of the sending individual, a picture and/or a first name of the person that is determined to be the receiving individual, the picture and/or the first name of the person being the second non-private identifying information.

8. The computer-implemented method of claim 1, wherein the receiving individual does not provide banking information, an email address, or a phone number to the sending individual so as to maintain the privacy of the receiving individual.

9. The computer-implemented method of claim 1, wherein the sending individual does not provide banking information or private identifying information to the receiving individual so as to also maintain the privacy of the sending individual.

10. The computer-implemented method of claim 1, wherein receiving the unique non-private identifying code, barcode, or QR code of the receiving individual comprises receiving the unique non-private identifying QR code of the receiving individual, this QR code being the first non-private identifying information of the receiving individual.

11. A system for electronically transferring money in person from a sending individual to a receiving individual while providing privacy to the receiving individual, said system comprising at least one processor programmed to:

receive, from a portable electronic device of the sending individual, an image, fingerprint, or iris scan of the receiving individual that was captured by the portable electronic device of the sending individual, wherein the image, fingerprint, or iris scan is first non-private identifying information of the receiving individual, wherein the receiving individual does not provide banking information or private identifying information to the sending individual so as to maintain the privacy of the receiving individual, and wherein the sending individual and the receiving individual are at the same location;

determine identity of the receiving individual based on the first non-private identifying information of the receiving individual;

send, to the portable electronic device of the sending individual, second non-private identifying information of a person that is determined to be the receiving individual so as to allow the sending individual to confirm that the identity of the receiving individual, the second non-private identifying information being different than the first non-private identifying information;

receive, from the portable electronic device of the sending individual, a confirmation that the identity of the receiving individual was correctly determined;

receive, from the portable electronic device of the sending individual, an indication of an amount of money to be transferred from the sending individual to the receiving individual; and debit an account of the sending individual and credit an account of the receiving individual based on the amount of money to be transferred, wherein the sending to the portable electronic device of the sending individual and/or at least one of the receiving from the portable electronic device of the sending individual comprises communicating data wirelessly to and/or from the portable electronic device of the sending individual via at least one of an IEEE 802.11 wireless communication protocol, a wireless communication protocol in which two or more piconets form a scatternet, a cellular protocol that provides for orthogonal frequency-division multiple access, or a version of the 5G cellular protocol.

12. The system of claim 11, wherein receiving the image, fingerprint, or iris scan of the receiving individual comprises receiving, from the portable electronic device of the sending individual, the image of the receiving individual that was captured by the portable electronic device of the sending individual, determining identity comprises using facial recognition to determine the identity of the receiving individual based on the image of the receiving individual that was captured by the portable electronic device of the sending individual, and sending second non-private identifying information comprises sending, to the portable electronic device of the sending individual, a picture from a database of the person that is determined to be the receiving individual, the picture of the person being the second non-private identifying information.

13. The system of claim 11, wherein the account of the sending individual is one of a bank account, a credit card account, and an online payment system account, and the account of the receiving individual is one of a bank account and an online payment system account.

14. The system of claim 11, wherein receiving the image, fingerprint, or iris scan of the receiving individual comprises receiving the image of the receiving individual that was captured by the portable electronic device of the sending individual, and the at least one processor is programmed to use facial recognition to determine the identity of the receiving individual based on the image.

15. The system of claim 11, wherein the at least one processor is further programmed to:

receive additional indications of amounts of money to be transferred from the sending individual; and receive additional indications of amounts of money to be transferred to the receiving individual, wherein debiting the account of the sending individual and crediting the account of the receiving individual comprises:

summing all of the amounts of money to be transferred from the sending individual over a specified period and making a single debit to the account of the sending individual based on the sum; and summing all of the amounts of money to be transferred to the receiving individual over the specified period and making a single credit to the account of the receiving individual based on the sum.

16. A system for electronically transferring money in person from a sending individual to a receiving individual while providing privacy to the receiving individual, the system including at least one processor programmed to:

receive, from a portable electronic device of the sending individual, a location of the sending individual that was determined by the portable electronic device of the sending individual, wherein the location is first non-private identifying information, and wherein the receiving individual does not provide banking information or private identifying information to the sending individual so as to maintain the privacy of the receiving individual;

use the first non-private identifying information to determine identity of the receiving individual based on proximity of the receiving individual and the sending individual, the sending individual and the receiving individual being at the same location;

send, to the portable electronic device of the sending individual, second non-private identifying information of a person that is determined to be the receiving individual so as to allow the sending individual to confirm that the identity of the receiving individual, the second non-private identifying information being different than the first non-private identifying information;

receive, from the portable electronic device of the sending individual, a confirmation that the identity of the receiving individual was correctly determined;

receive, from the portable electronic device of the sending individual, an indication of an amount of money to be transferred from the sending individual to the receiving individual; and debit an account of the sending individual and credit an account of the receiving individual based on the amount of money to be transferred, wherein the sending to the portable electronic device of the sending individual and/or at least one of the receiving from the portable electronic device of the sending individual comprises communicating data wirelessly to and/or from the portable electronic device of the sending individual via at least one of an IEEE 802.11 wireless communication protocol, a wireless communication protocol in which two or more piconets form a scatternet, a cellular protocol that provides for orthogonal frequency-division multiple access, or a version of the 5G cellular protocol.

17. The system of claim 16, wherein using the first non-private identifying information to determine identity of the receiving individual comprises determining other users at the same location based on the location of the sending individual, sending the second non-private identifying information comprises sending, to the portable electronic device of the sending individual, a list of the other users at the same location, and receiving the confirmation comprises receiving, from the portable electronic device of the sending individual, a selection of the receiving individual from the list of the other users at the same location.

18. The system of claim 16, wherein sending the second non-private identifying information comprises:

sending, to the portable electronic device of the sending individual, a picture and/or a first name of the person that is determined to be the receiving individual, the picture and/or the first name of the person being the second non-private identifying information.

19. The system of claim 16, wherein the at least one processor is further programmed to:

receive additional indications of amounts of money to be transferred from the sending individual; and receive additional indications of amounts of money to be transferred to the receiving individual, wherein debiting the account of the sending individual and crediting the account of the receiving individual comprises:

summing all of the amounts of money to be transferred from the sending individual over a specified period and making a single debit to the account of the sending individual based on the sum; and summing all of the amounts of money to be transferred to the receiving individual over the specified period and making a single credit to the account of the receiving individual based on the sum.

20. The system of claim 16, wherein receiving the location of the sending individual comprises receiving the location of the sending individual which was determined by the portable electronic device of the sending individual using triangulation processing of radio signal propagation delays to multiple cellular towers and/or using the known geographic location of short range wireless access points or beacons.

21. A system for electronically transferring money in person from a sending individual to a receiving individual while providing privacy to the receiving individual, the system including at least one processor programmed to:
   receive, from a portable electronic device of the sending individual, a unique non-private identifying code, barcode, or QR code of the receiving individual, wherein the code, barcode, or QR code is first non-private identifying information of the receiving individual, wherein the receiving individual does not provide banking information or private identifying information to the sending individual so as to maintain the privacy of the receiving individual, and wherein the sending individual and the receiving individual are at the same location;
   use the first non-private identifying information of the receiving individual to determine identity of the receiving individual;
   send, to the portable electronic device of the sending individual, second non-private identifying information of a person that is determined to be the receiving individual so as to allow the sending individual to confirm that the identity of the receiving individual, the second non-private identifying information being different than the first non-private identifying information;
   receive, from the portable electronic device of the sending individual, a confirmation that the identity of the receiving individual was correctly determined;
   receive, from the portable electronic device of the sending individual, an indication of an amount of money to be transferred from the sending individual to the receiving individual; and
   debit an account of the sending individual and credit an account of the receiving individual based on the amount of money to be transferred,
   wherein the sending to the portable electronic device of the sending individual and/or at least one of the receiving from the portable electronic device of the sending individual comprises communicating data wirelessly to and/or from the portable electronic device of the sending individual via at least one of an IEEE 802.11 wireless communication protocol, a wireless communication protocol in which two or more piconets form a scatternet, a cellular protocol that provides for orthogonal frequency-division multiple access, or a version of the 5G cellular protocol.

22. A computer-implemented method for electronically transferring money in person from a sending individual to a receiving individual while providing privacy to the receiving individual, said method comprising the steps of:
   receiving, from a portable electronic device of the sending individual, an image, fingerprint, or iris scan of the receiving individual that was captured by the portable electronic device of the sending individual, wherein the image, fingerprint, or iris scan is first non-private identifying information of the receiving individual, wherein the receiving individual does not provide banking information or private identifying information to the sending individual so as to maintain the privacy of the receiving individual, and wherein the sending individual and the receiving individual are at the same location;
   using the first non-private identifying information of the receiving individual to determine identity of the receiving individual;
   sending, to the portable electronic device of the sending individual, second non-private identifying information of a person that is determined to be the receiving individual so as to allow the sending individual to confirm that the identity of the receiving individual, the second non-private identifying information being different than the first non-private identifying information;
   receiving, from the portable electronic device of the sending individual, a confirmation that the identity of the receiving individual was correctly determined;
   receiving, from the portable electronic device of the sending individual, an indication of an amount of money to be transferred from the sending individual to the receiving individual; and
   debiting an account of the sending individual and crediting an account of the receiving individual based on the amount of money to be transferred,
   wherein the sending step and/or at least one of the receiving steps comprises communicating data wirelessly to and/or from the portable electronic device of the sending individual via at least one of an IEEE 802.11 wireless communication protocol, a wireless communication protocol in which two or more piconets form a scatternet, a cellular protocol that provides for orthogonal frequency-division multiple access, or a version of the 5G cellular protocol.

23. A computer-implemented method for electronically transferring money in person from a sending individual to a receiving individual while providing privacy to the receiving individual, said method comprising the steps of:
   receiving, from a portable electronic device of the sending individual, a location of the sending individual that was determined by the portable electronic device of the sending individual, wherein the location is first non-private identifying information, and wherein the receiving individual does not provide banking information or private identifying information to the sending individual so as to maintain the privacy of the receiving individual;
   using the first non-private identifying information to determine identity of the receiving individual based on proximity of the receiving individual and the sending individual, the sending individual and the receiving individual being at the same location;
   sending, to the portable electronic device of the sending individual, second non-private identifying information of a person that is determined to be the receiving individual so as to allow the sending individual to confirm that the identity of the receiving individual, the second non-private identifying information being different than the first non-private identifying information;
   receiving, from the portable electronic device of the sending individual, a confirmation that the identity of the receiving individual was correctly determined;
   receiving, from the portable electronic device of the sending individual, an indication of an amount of money to be transferred from the sending individual to the receiving individual; and
   debiting an account of the sending individual and crediting an account of the receiving individual based on the amount of money to be transferred, wherein the sending step and/or at least one of the receiving steps comprises communicating data wirelessly to and/or from the portable electronic device of the sending individual via at least one of an IEEE 802.11 wireless communication protocol, a wireless communication protocol in which two or more piconets form a scatternet, a cellular protocol that provides for orthogonal frequency-division multiple access, or a version of the 5G cellular protocol.

* * * * *